United States Patent [19]

Pearl et al.

[11] Patent Number: 4,646,911
[45] Date of Patent: Mar. 3, 1987

[54] CONVEYORIZED VACUUM TABLE FOR FEEDING SHEET MATERIAL

[75] Inventors: David R. Pearl; Lawrence S. Wolfson, both of West Hartford, Conn.

[73] Assignee: Gerber Garment Technology, Inc., South Windsor, Conn.

[21] Appl. No.: 772,664

[22] Filed: Sep. 5, 1985

[51] Int. Cl.⁴ .............................................. B65G 15/18
[52] U.S. Cl. .................................. 198/689.1; 271/197; 271/276
[58] Field of Search ...................... 198/689.1; 271/276, 271/197, 94, 96, 34, 35

[56] References Cited

U.S. PATENT DOCUMENTS

| | | | |
|---|---|---|---|
| 29,124 | 1/1877 | Hudson | 198/689.1 X |
| 2,969,869 | 1/1961 | Klinger | 271/197 X |
| 3,359,648 | 12/1967 | Overly et al. | 271/197 X |
| 3,477,558 | 11/1969 | Fleischauer | 198/689.1 |
| 3,715,945 | 2/1973 | Mochizuki et al. | |
| 3,889,801 | 6/1975 | Boyer | 198/689.1 |
| 4,096,941 | 6/1978 | Tokuno | 198/689.1 |
| 4,322,993 | 4/1982 | Stumpf | 198/689.1 X |
| 4,345,496 | 8/1982 | Pearl | |
| 4,411,420 | 10/1983 | Louis et al. | 271/276 |
| 4,476,756 | 10/1984 | Pearl et al. | |
| 4,555,013 | 11/1985 | Franklin | 198/689.1 |

Primary Examiner—Horace M. Culver
Attorney, Agent, or Firm—McCormick, Paulding & Huber

[57] ABSTRACT

A conveyorized vacuum table comprises a conveyor for feeding and supporting limp sheet material and a vacuum system which applies vacuum to the sheet material while it is being fed and/or worked upon. The conveyor comprises a penetrable support bed and a plurality of vacuum chambers which move with the support bed and communicate with it. Means are also provided to apply vacuum to the vacuum chambers to cause the conveyor to hold the sheet material for cutting or other work operations.

15 Claims, 16 Drawing Figures

CONVEYORIZED VACUUM TABLE FOR FEEDING SHEET MATERIAL

This invention relates generally to conveyor tables for feeding and supporting sheet material and deals more particularly with an improved means for subjecting the sheet material to a vacuum while it is being fed and/or supported.

A currently known conveyorized vacuum table may be used for drawing layups of sheet material from a roll and feeding it to a cutting head located over the table and for removing cut pattern pieces and scrap. The vacuum holds the layup to the conveyor and also compresses it to improve cutting accuracy as discussed in U.S. Pat. No. 3,495,492 to Gerber issued Feb. 17, 1970, assigned to the assignee of the present invention, and hereby adopted by reference as part of the present disclosure.

The type of conveyorized vacuum table disclosed in U.S. Pat. No. 4,476,756 also includes a container which surrounds the conveyor on all sides except the top and defines a vacuum chamber. The conveyor belt comprises sections or slats having a penetrable, bristle surface which forms a bed for supporting the sheet material and also comprises chains and sprockets which propel the slats. A vacuum pump generates a vacuum in the chamber defined between the container walls and the bristle surface. The vacuum migrates longitudinally and laterally through the bristles and thereby compresses and holds the sheet material in place on top of the conveyor for cutting by an automatically controlled cutting blade. After cutting one segment of the material on the table, the conveyor moves, the sheet material moves with it, and another fresh segment of sheet material is drawn onto the conveyor where it is cut. The cut pattern pieces and scrap are removed from the end of the conveyor opposite the end onto which the fresh material is drawn.

There are a few drawbacks to this type of table. First, the container is relatively large, heavy, and expensive to produce. Second, the container impedes access to those portions of the belt which surround the belt sprockets. Access to these portions of the belt is very useful in servicing the belt and drive components. The slats separate from one another when traveling around the sprockets at ends of the conveyor, and as a result, sacrificial air-impermeable barriers on the sides of the slats are exposed and could be readily inspected and replaced but for the container. Third, the vacuum is applied to the entire container and top of the table, so that a large vacuum pump and significant power are required. Fourth, because the vacuum is applied to the material during movement of the conveyor for greater frictional engagement, the pattern pieces and scrap adhere to the table and are not easy to remove.

A second type of conveyor table presently known in the industry and disclosed in U.S. Pat. No. 4,345,496 comprises a conveyor belt having a penetrable bristle bed portion and a gridded base portion. The table also comprises a plurality of stationary vacuum chambers supported beneath the upper run of the conveyor belt, which chambers extend transversely of the table and have apertures at the top. The upper run of the conveyor belt slides over the tops of the vacuum chambers and communicates with them via the apertures. The permeable, gridded base portion causes the vacuum to be applied uniformly to the bristle bed. Means are also provided to selectively apply vacuum to one or more of the vacuum chambers as desired. This type of table offers the advantages of vacuum zoning, i.e., a smaller vacuum pump and ease in removing cut pattern pieces and scrap from the discharge end of the conveyor by removing the vacuum at the discharge end of the table after cutting. However, there is a large contact area between the tops of the vacuum chambers and the underside of the belt, and atmospheric pressure acts downwardly on the conveyor above this contact area. Because little pressure acts upwardly on the conveyor from within the vacuum chamber, the net downward atmospheric force on the conveyor is significant and causes a significant frictional sliding force when material is moved on the table under even a reduced vacuum. Rollers or low friction seals must be used at the chamber/belt interface to lessen the amount of friction.

A general object of the invention is to provide a table having means for feeding sheet material and applying a vacuum to hold and/or compress it.

A more specific object of the invention is to provide a table of the foregoing type which does not require a surrounding container to define the vacuum chamber, and which develops less friction between the conveyor and other parts of the table than the aforesaid sliding-belt type of conveyorized vacuum table.

Still another specific object of the invention is to provide means for applying vacuum to selected zones of the table and the portions of sheet material support thereon.

Yet another specific object of the invention is to provide a conveyorized vacuum table which provides vacuum in a cutting region but does not provide vacuum at one end of the table to facilitate removal of cut pattern pieces.

Yet another specific object of the invention is to provide a conveyorized vacuum table in which the portion of the conveyor belt adjacent at least one end sprocket is readily accessible.

SUMMARY OF THE INVENTION

The invention resides in an apparatus for feeding and cutting limp sheet material which apparatus comprises a conveyor for feeding and supporting the sheet material and a vacuum system which applies vacuum to the sheet material while it is being fed and/or worked upon. The conveyor belt itself comprises a penetrable support bed and a plurality of vacuum chambers which move with the support bed and communicate with it. Means are also provided to apply vacuum to the vacuum chambers to cause the conveyor to hold the sheet material in place on the conveyor during cutting or feeding operations.

DETAILED DESCRIPTION OF THE PREFERRED EMBODIMENTS

Figure 1:
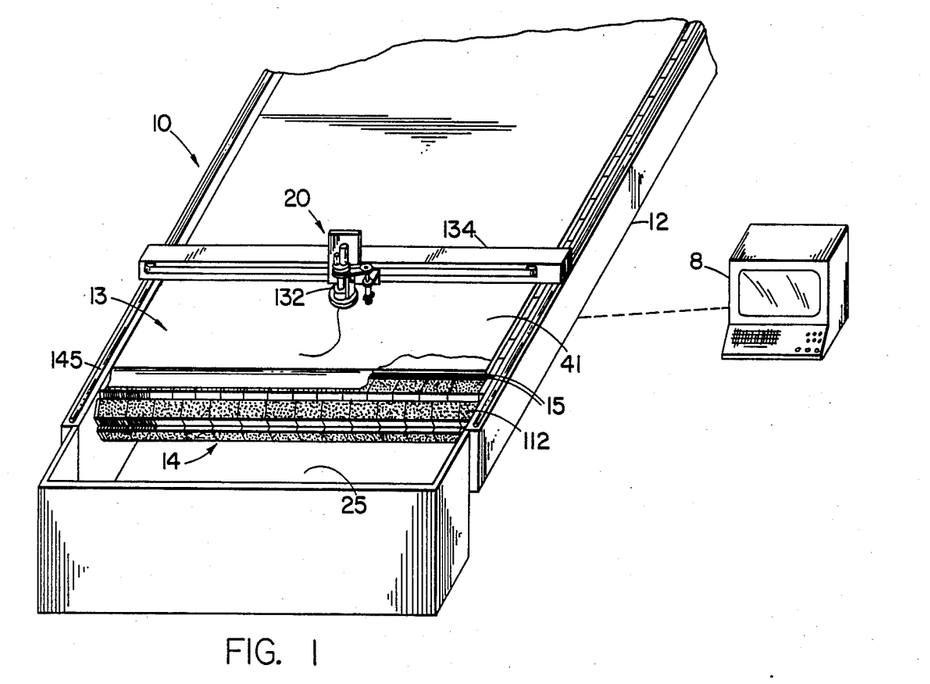
FIG. 1 is a top perspective view of a conveyor table embodying the present invention.
Figure 2:
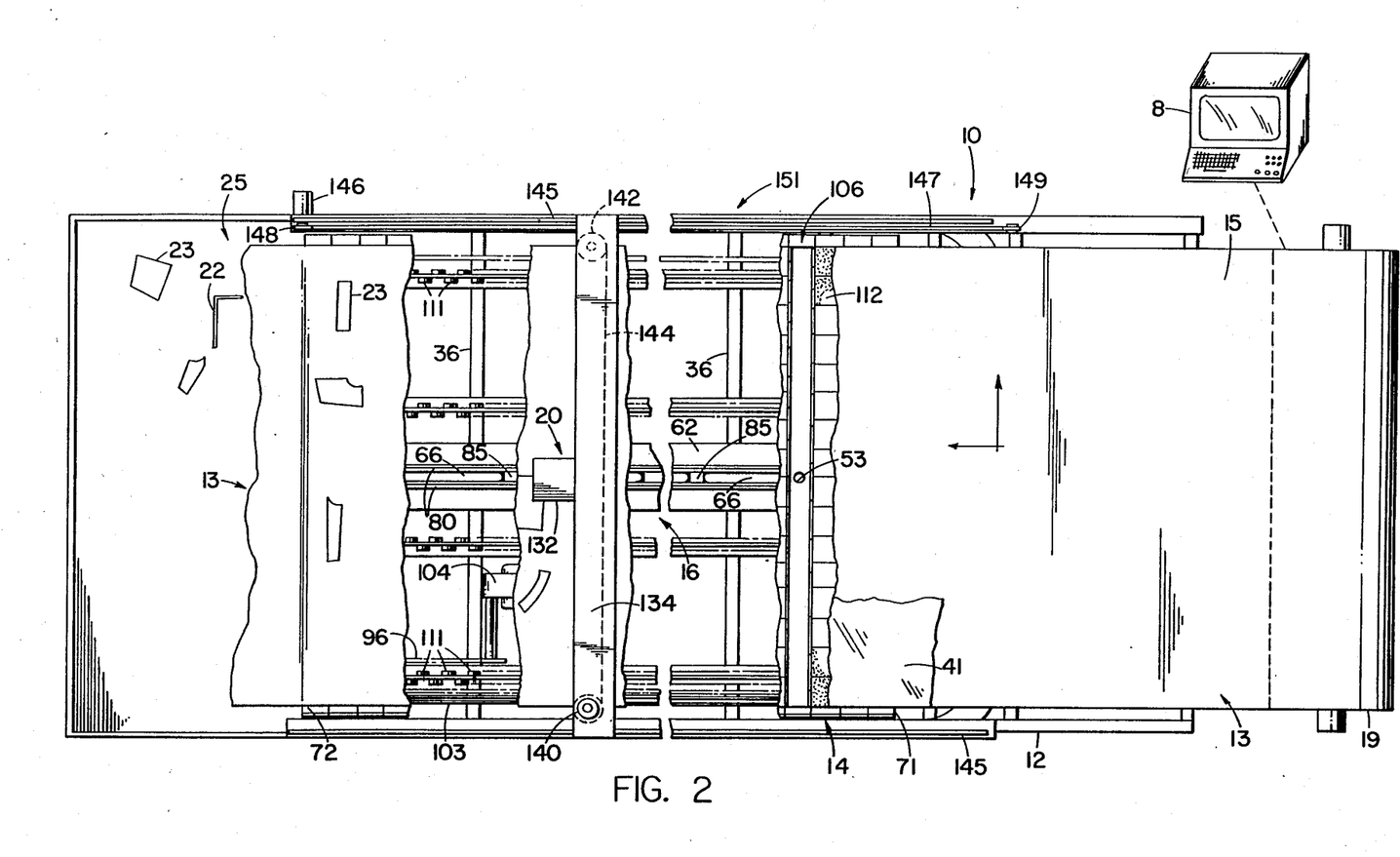
FIG. 2 is a top view of the conveyor table of FIG. 1 with parts broken away.

FIGS. 1 and 2 illustrate a conveyorized, vacuum table generally designated 10 in which the invention is embodied. The table 10 includes a frame 12, a conveyor 14 for supporting and transporting sheet material 15, a vacuum hold down system 16 for holding the sheet material 15 onto the conveyor 14, a cutter assembly 20 for cutting the sheet material 15 and a controller 8 including a computer.

In the illustrated emodiment, the sheet material 15 is stored on one or more rolls 19 at the one end of the table 10 and is drawn from the rolls onto the table to form a layup 13, covered by a plastic overlay 41. The layup 13 is drawn onto the table in an illustrated X-coordinate direction by the conveyor 14 where it is cut into pattern pieces 23 and scrap 22. Then, the cut material is transported by the conveyor 14 further in the X-coordinate direction until the pattern pieces 23 and the scrap 22 fall into a collecting hopper 25 at the discharging end of the conveyor.

Figure 3:
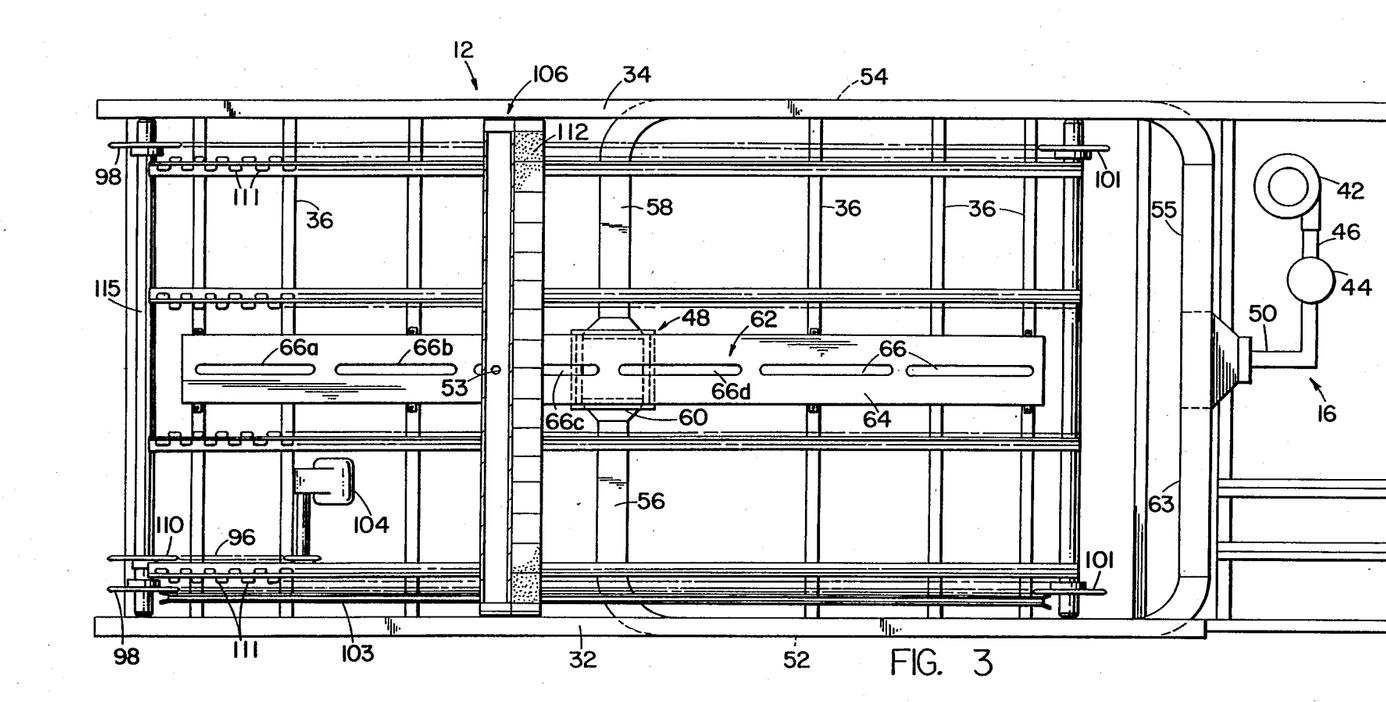
FIG. 3 is a top plane view of a frame and vacuum system of the table of FIG. 2.
Figure 4:
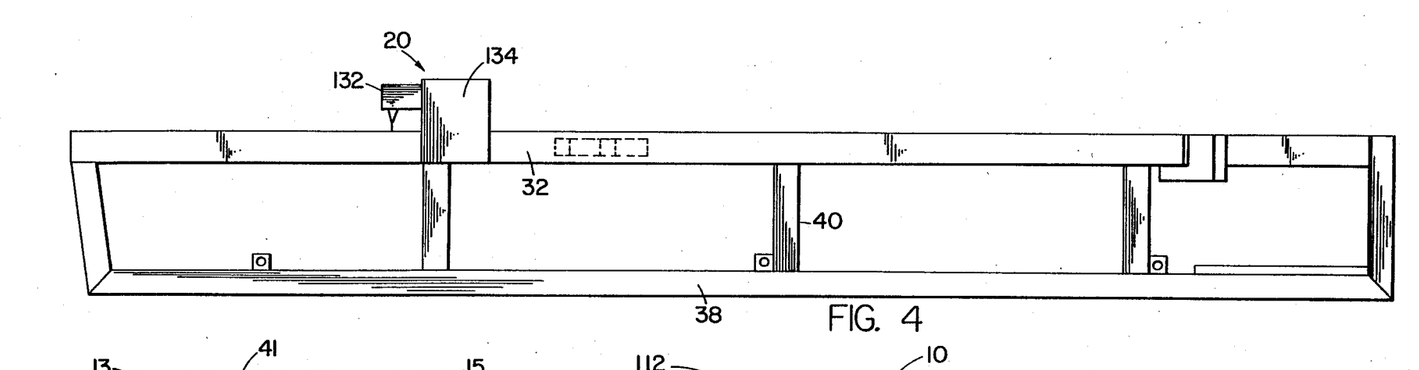
FIG. 4 is a side view of FIG. 3.

As shown in FIGS. 3–4, the frame 12 includes hollow beams 32 and 34 which form upper side edges of the frame 12, cross beams 36,36 which join the upper side edge beams 32 and 34, base beams 38,38 and legs 40,40 which extend from the base beams 38,38 and support the upper side, edge beams 32 and 34.

As shown in FIG. 3, the vacuum system 16 comprises a vacuum pump 42, a filter 44, a hose 46 coupling the vacuum pump to the filter 44, a vacuum duct network 48 partially integrated with the frame 12 and a hose 50 coupling the filter 44 to the vacuum duct network 48. The vacuum duct network 48 utilizes portions 52 and 54 of the hollow beams 32 and 34, respectively, and also comprises ducts 63 and 55 coupling the hose 50 to the portions 52 and 54 respectively, ducts 56 and 58 leading inwardly from the portions 52 and 54, a central vacuum chamber 60 joining the two ducts 56 and 58 with a vacuum manifold 62.

Figure 5:
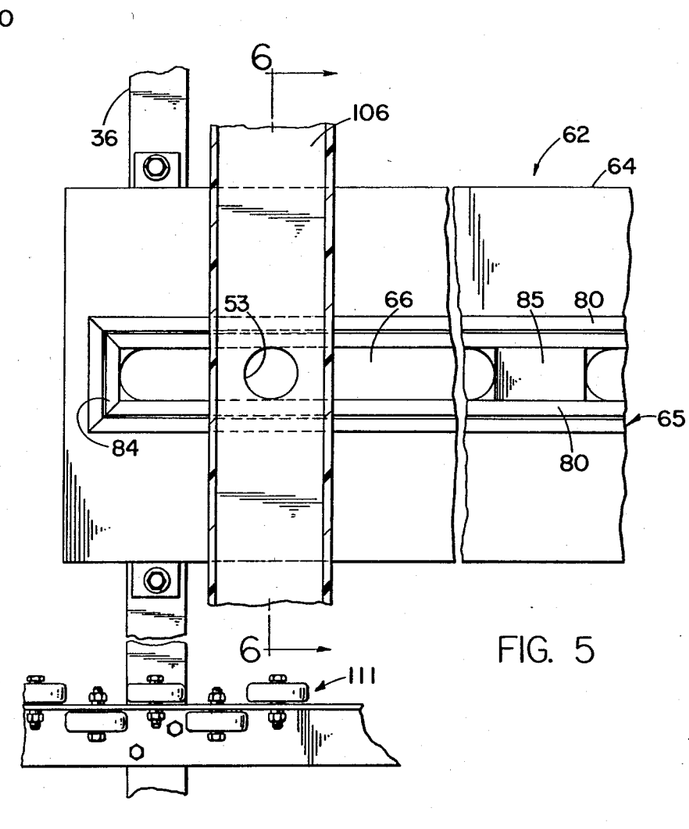
FIG. 5 is an enlarged, fragmentary view of a vacuum manifold of the table of FIG. 2.
Figure 6:
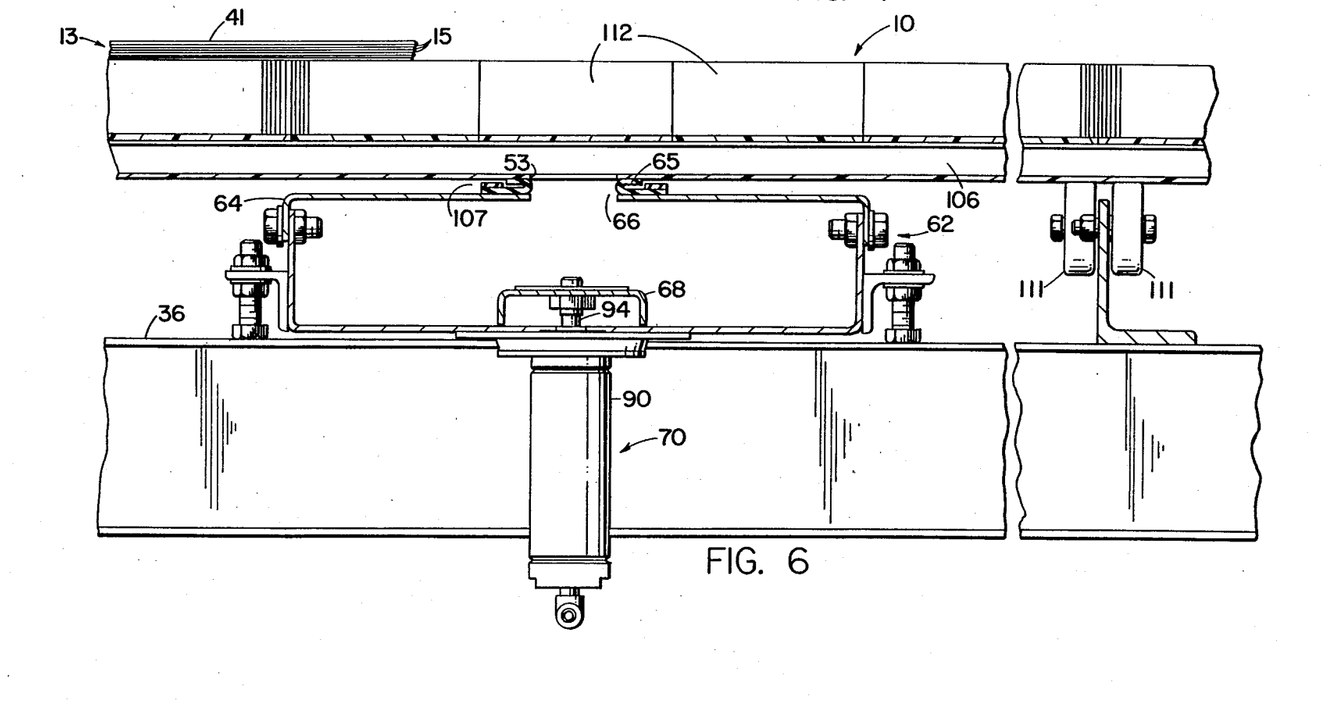
FIG. 6 is a sectional view of FIG. 5 taken along the line 6—6.

The vacuum manifold 62 (FIGS. 2, 3, and 5) comprises a duct 64 with window openings 66,66 facing upwardly and exposing the interior of the duct 64. A lip seal 65 shown in FIGS. 5 and 6 is attached at the upper borders of the windows 66,66, and plunger shutters 68,68 are used to individually close and seal the windows 66,66 from below. Pneumatic or electrical actuators 70,70 move the shutters 68,68 up and down to close and open the windows 66,66 respectively. The vacuum duct 64 extends from a receiving end 71 of the table 10 shown in FIG. 2, where the sheet material 15 is drawn from the roll 19, to a short distance from a discharge end 72 of the table 10 where the cut pattern pieces 23 and scrap 22 are removed from it. By way of example, the table 10 is 16 feet long, each window 66 is approximately two feet long and three inches wide with the windows separated from each other by one inch, and the vacuum duct 64 extends to approximately one foot of the discharge end 72 of the table.

In the illustrated embodiment of FIGS. 5 and 6, the lip seal 65 comprises two longitudinal portions 80,80, which extend approximately the entire length of the manifold 62 along the sides of the windows 66,66, lateral portions 84,84 which join the longitudinal portions 80,80 at their ends, and lateral portions 85,85 which join the longitudinal portions between pairs of adjacent windows 66,66 and isolate the windows 66,66 from each other to form a rectangular border which surrounds each of the windows 66,66. Hence, it is possible to apply vacuum to the surface of bristle mats in selected rows or zones, those located above one or more of the windows 66, 66, by opening these windows (deactivating the associated actuators 70,70) and closing the other windows (activating the associated actuators 70,70). One purpose for zoning the table is to conserve vacuum and thereby make it possible to utilize an even smaller vacuum pump and to decrease the power consumption of it. The unbalanced area of the conveyor which is exposed to atmospheric pressure is the area within the lip seal 65 over an open window or windows 66,66, and this area is small due to the narrow separation between the seal portions 80,80. Consequently, the net downward force on the conveyor due to atmospheric pressure and the resulting frictional sliding forces are small and still smaller if some of the windows 66,66 are closed when the conveyor is moved.

Each of the actuators 70 comprises a piston and cylinder assembly 90, and the associated shutter 68 is fixedly attached to a piston rod 94 of the piston and cylinder assembly 90, the shutter taking the form of a flat plate. The piston rod 94 is normally retracted biased and when the assembly is activated, the piston lifts the shutter 68 upwardly to close the associated window 66.

Figures 7, 9:
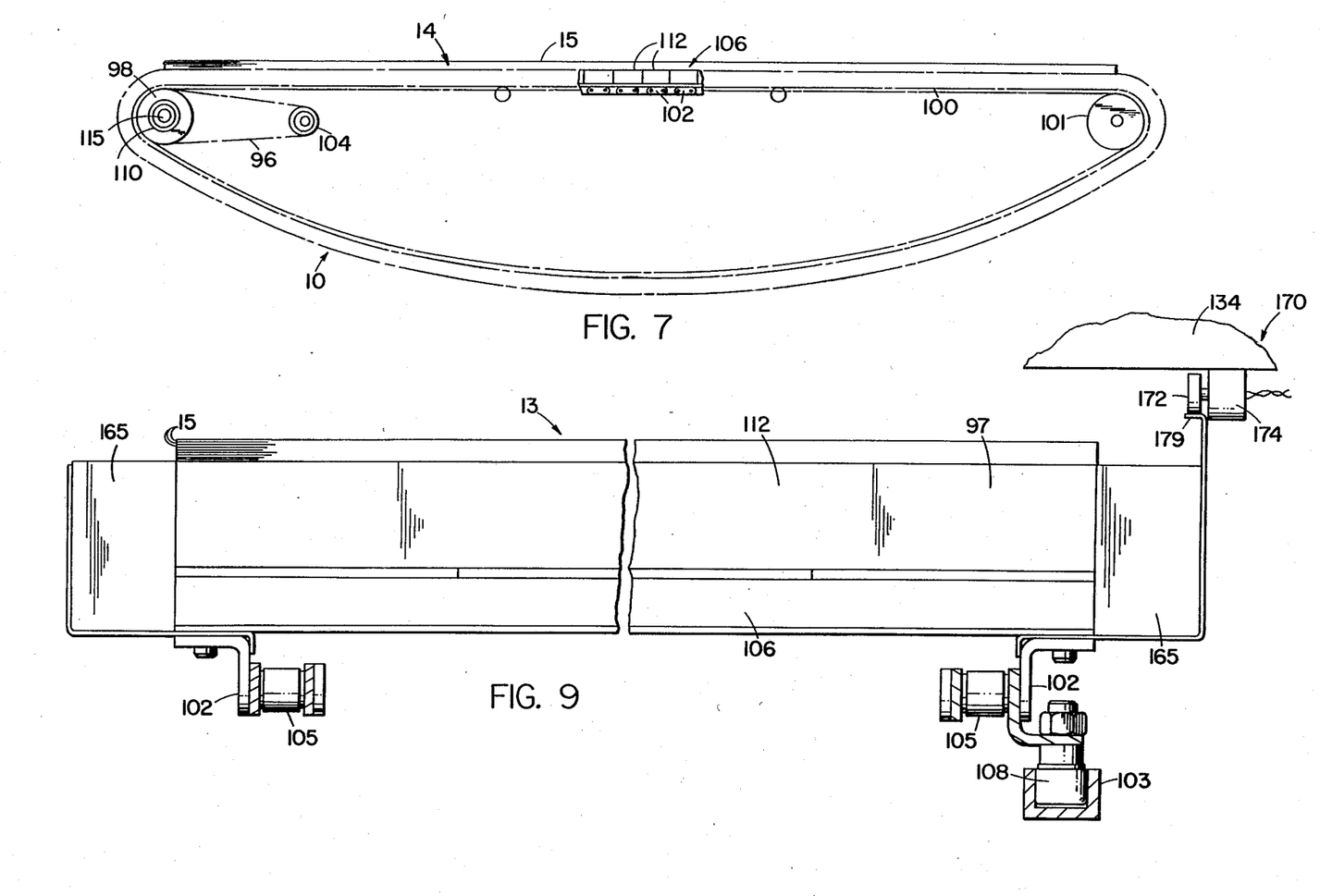
FIG. 7 is a side view of a conveyor of the table of FIG. 2.
FIG. 9 is a side view of a slat of FIG. 8.
Figure 8:
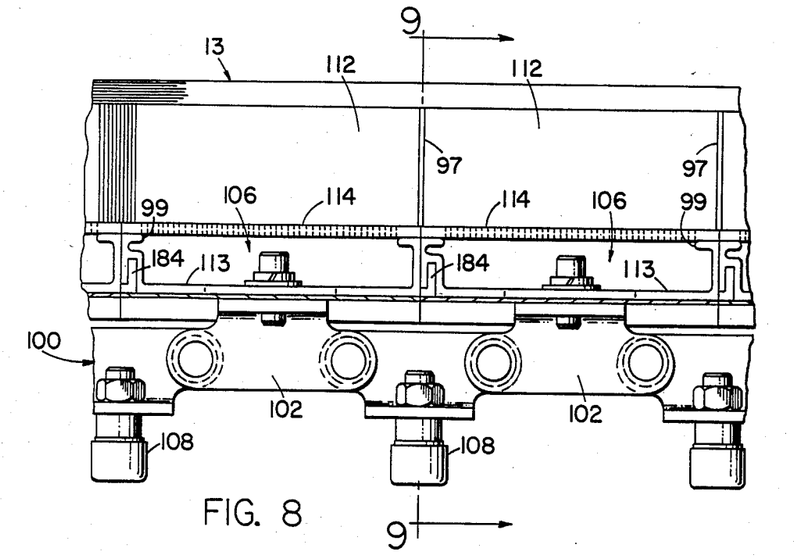
FIG. 8 is an end, sectional view of slats and bristle mats of the conveyor of FIG. 7.

As shown in FIG. 7, the conveyor 14 includes a pair of drive chains 100,100 and a corresponding pair of drive sprockets 98,98 rotatably mounted at the discharging end on the sides of the conveyor frame 12 which sprockets engage protruding stems 105,105 (FIG. 9) of the chain 100. A pair of idler sprockets 101,101 support the drive chains 100,100 at the loading end of the conveyor frame, and a drive motor 104 and intermediate drive chain 96 and sprocket 110 drive a shaft 115 to which the sprockets 98,98 are fixed. Vacuum chambers or slats 106,106 (also referred to as ducts) are mounted to and driven by the chains 100,100. As shown in FIGS. 2 and 8, each of the slats 106,106 has a generally trough-shaped housing 113 with a rectangular opening 99 at the top, and has an aperture 53 passing through the bottom of the housing. The composite area of the underside of the bristle mats is large, and the slats receive air which is drawn through the underside of the bristle mats. Then, the slats funnel the air to the relatively small windows 66, 66 of the manifold 62. By way of example, the aperture is 1¾ inches in diameter so that when the slat is located between two adjacent windows 66,66 of the vacuum manifold 62, it overlaps them and spans the underlying lip seal portion 85, and the chamber within the slat communicates with the vacuum duct 64 when either or both of the adjacent windows are open.

As shown in FIGS. 7 and 8, the chains 100,100 are made of links 102,102 and each of the links 102,102 of one chain 100 is laterally aligned with a corresponding link 102 of the other chain. Chain guides 103,103 on the frame 12 and chain followers 108 on the links 102 are also included. Each of the slats 106,106 is attached to two such corresponding links which links propel it in the X-coordinate direction. As shown by the end view of FIG. 8, each of the slats includes a recess adjacent the adjoining slat which recess runs the length of it, has an "L" shaped cross section, and snugly receives a rubber strip 184 which is also "L" shaped in cross-section and runs the length of the slat 106. The rubber strip 184 forms a lip along the length of the slat, makes an airtight seal between the adjacent slats and against the lip seals, and prevents the vacuum from escaping through the inner side of the conveyor belt.

As shown in FIGS. 2 and 6, the slats 106,106 are supported by rollers 111,111 which minimize the frictional forces acting on the slats when the conveyor 14 moves. The height of the rollers 111,111 is such that they support the slats 106,106 to approximately the height of the lip seal 65 so that the lip seal maintains contact with the slats but supports little of their weight.

A bristle mat 112 is fixedly attached to the slat 106 by either glue, bolts, or anchors (none shown) and supported on the slat 106 to form a penetrable support surface for the sheet material 15. Each of the mats 112 includes a perforated base portion 114, which allows the bristle support surface to communicate with the interior of the slats and the vacuum manifold 62.

FIG. 9 illustrates end caps 165,165 which are fixedly attached to the ends of the slat 106 to seal it and prevent ambient air from entering. The other slats 106,106 are similarly sealed. The end caps may be made of air-impermeable foam (as shown) and bonded to the associated slat or made of sheet metal. With the slats 106,106 sealed at the ends, air is withdrawn from the limp sheet material 15 on the conveyor, through the bristle mats 112,112, the chambers within the slats 106,106, the vacuum manifold 62, the central vacuum chamber 60, the vcuum ducts 56 and 58, the frame portions 52 and 54, the ducts 63 and 55, the hose 50, the filter 44, the hose 46 and the vacuum pump 42.

As shown in FIG. 2, the cutter assembly 20 includes a cutting head 132 having a cutting instrument such as a reciprocating knife blade which plunges through the layup 13 of limp sheet material and into the bristles during cutting. The cutting head 132 is mounted to a carriage and is movable in the illustrated Y-coordinate direction in a conventional manner by means of a servomotor 140, a timing pulley directly driven by the motor, an idler pulley 142, and a timing belt 144 trained about the two pulleys, which belt is attached to the carriage. The cutting head 132 and carriage are also movable in the illustrated X-coordinate direction by a drive system including a beam or gantry 134, guides 145,145 which support the gantry, a servomotor 146, a timing pulley 148 directly driven by the motor 146, an idler pulley 149, and a timing belt 147 trained about the two pulleys 148 and 149, which belt is attached to one end of the gantry 134. Both servomotors are controlled by a controller 8. For a further description of an apparatus capable of moving a head such as the cutting head 132 in a plane parallel to a work surface, reference may be made to U.S. Pat. No. 3,529,0842 to Rich, issued Sept. 15, 1970, assigned to the assignee of the present invention and hereby incorporated by reference as part of the present disclosure.

The conveyor table 10 is equipped for computer controlled, automatic operation after an initial, manual setup. During the setup, an operator activates the vacuum pump 42 and manually pulls one or more lengths of the sheet material 15 from the rolls 19,19 and places them on the receiving end 71 of the conveyor table 12 over the belt; all of the actuators 70,70 are deactivated at this time, so that the vacuum holds the sheet material to the belt. Then, the operator manually activates the conveyor 14 to pull a complete bite or segment of the sheet material 15 onto the table 10 so that the sheet material extends almost to the discharge end of the table. Next, the operator activates the controller 8 which directs the cutting head 132 to cut a portion of the sheet material into the pattern pieces 23,23, that portion which is supported on a cutting region 151 of the table. By way of example, the cutting region 151 extends to within two feet from each end of the table.

After cutting, the computer activates the conveyor 14 to simultaneously transport the cut pattern pieces 23,23 and scrap 22 into the collecting hopper 25 and to draw a fresh bite of sheet material onto the cutting region 151 of the table. In one zoning arrangement made possible by the vacuum manifold 62, the actuators 70,70 are controlled by the controller 8, such that vacuum is applied to a region surrounding the cutting head 132, for example, at least two feet in both the plus X-coordinate direction and the minus X-coordinate directions of the cutting blade at all times. In this example, if the cutting head is located over the window 66 indicated as c in FIG. 3, then the actuator 70 associated with the window 66c as well as the actuators 70,70 associated with the adjacent windows 66,66 indicated as b and d are also deactivated to keep these windows open, and the other actuators 70,70 are activated to close the associated windows. Hence, vacuum is applied primarily to the bristle mats above the windows 66b-d; typically, there is some longitudinal leakage of the vacuum through the bristle mats so that the sheet material 15 supported on regions upstream and downstream of the windows 66b-d are exposed to some degree of vacuum although much less than that which acts on the sheet material located above the windows 66b-d. Note that because the diameter of the aperture 53 in the bottom of each slat 106 is larger than the separation distance between adjacent windows, when a slat 106 is located between two such windows and either one or both of the windows are open, the slat is evacuated.

When the cutting head 132 is moved in the X-coordinate direction while cutting pattern pieces or relocating itself after a new bite of sheet material has been fed, the controller activates and deactivates the appropriate actuators 70,70 to cause the vacuum to follow and continually surround the cutting head. In addition, when it is time to feed a fresh bite of sheet material onto the cutting table, one or more of the actuators 70,70 at the receiving end 71 of the table are deactivated to open the associated windows 66,66 and thereby cause the conveyor belt to hold the sheet material 15 and allow it to pull it as the conveyor moves. Also, when it is time to remove pattern pieces and scrap, usually simultaneously with the bite feeding, the actuator 70 at the discharge end 72 of the table may be activated to close the associated windows and thereby facilitate the removal of the pattern pieces and scrap and their discharge into the collecting hopper 25. Note that the closure of the window 66a is not necessary for purposes of removal because the vacuum manifold does not extend all the way to the discharge end of the table 10, so that the cut pattern pieces 23 and scrap 22 located there are exposed to little vacuum anyway. In another mode of operation, all of the actuators 70,70 are deactivated all of the time so that all of the windows 66,66 are open and all of the bristle mats 112,112 located above the vacuum manifold 62 are subject to vacuum. This vacuum not only holds the sheet material to the conveyor belt during bite feeding of the fresh sheet material, but also compresses the layup 13 of sheet material under the air-impermeable overlay 41 to facilitate and improve the accuracy of the cutting.

For many applications, air-impermeable, Mylar strip barriers 97,97 (FIG. 8) are installed between the rows of bristle mats 112,112. Each of the Mylar strip barriers has a tacky surface which adheres to the side of one row of bristle mats like a strip of adhesive tape, and extends laterally across the entire width of the table to prevent leakage of air in the X-coordinate direction through the bristles from one row of bristle mats to the next. These barriers prevent the vacuum from reaching the cut pattern pieces and scrap at the discharge end 72 of the table so that the pattern pieces and scrap are easily removable and can fall freely into the collecting hopper 25 as the conveyor moves. Also, at the discharge end of the table as well as at the receiving end of the table, the slats 106,106 travel around the sprockets 98,98 and thereby separate slightly from one another causing the rows of bristle mats 112,112 to separate; the Mylar strips prevent the vacuum from migrating longitudinally to the bristle mats which are adjacent the sprockets so that the vacuum will not escape out the side of the conveyor 14 through the openings between the rows of bristle mats. In general, the Mylar strips 97,97 confine the vacuum to the cutting and receiving regions of the conveyor table overlying the vacuum manifold 62 and make it possible to use a modestly sized vacuum pump, one which utilizes a modest amount of power. In other applications, the Mylar strips 97,97 may be installed at greater distances than that between each row of bristle mats and may, for example, be installed at every other row of bristle mats.

It should also be noted that during cutting of the layup 13, the Mylar strips 97,97 will be cut themselves along with the limp sheet material, and therefore, they must be periodically replaced. Such replacement can easily be accomplished at the discharge end 72 of the table because the rows of mats are separated from one another there, and the collecting hopper 25 provides ready access to the mats.

Frequently, a pattern piece which is programmed to be cut from the sheet material 15 is located within two adjacent bites of it, and it is important to cut this pattern piece as accurately as the others. To this end, the cutting head 132 first makes all the cuts from the first bite of the sheet material, which cuts produce completed pattern pieces as well as portions of the pattern pieces which overlap two bites. Then, the controller 8 activates the conveyor 14 to feed the second bite of sheet material onto the cutting region 151 of the table 10 and also activates the X-motor 146 to move the cutting head 132 to the X-coordinate location of the demarcation between the two bites.

The controller 8 locates the line of demarcation with the aid of a tracking system 170 (FIGS. 2 and 9), which comprises a wheel 172 supported by the gantry 134, and a rotary encoder 174 coupled to the wheel 172 which encoder monitors the angular motion of the wheel and is sensed by the controller 8. The wheel 172 maintains contact with a side lip 179 of the conveyor belt 14 and turns as the conveyor 14 or the gantry 134 moves. Hence, the wheel monitors the relative position between the gantry 134 and the belt 14 in the X-coordinate direction, and when the cutting head 132 finishes cutting each bite of sheet material and is located on the line of demarcation, the computer senses and stores the setting of the encoder 174. Then, while the next bit of sheet material 15 is fed onto the table, the conveyor 14 moves relative to the gantry 134 changing the setting of the encoder. However, the controller also causes the gantry 134 to move in the +X-coordinate direction until the setting of the encoder returns to what is was before the last bite was fed (or it simply moves the gantry in unison with the belt 14 so that the setting does not change). At this time, the cutting head 132 is located at the X-coordinate location corresponding to the demarcation between the previous bite of sheet material and the beginning of the subsequent bite of sheet material so that the cutting head 132 can resume the cutting where it left off and thereby, finish cutting the pattern pieces which it began in the previous bite and also cut additional ones. For a further description of such a tracking system, reference may be made to U.S. Pat. No. 4,345,496 to Pearl, issued August 24, 1982, assigned to the assignee of the present invention and hereby incororated by reference as part of the present disclosure.

Figure 10:
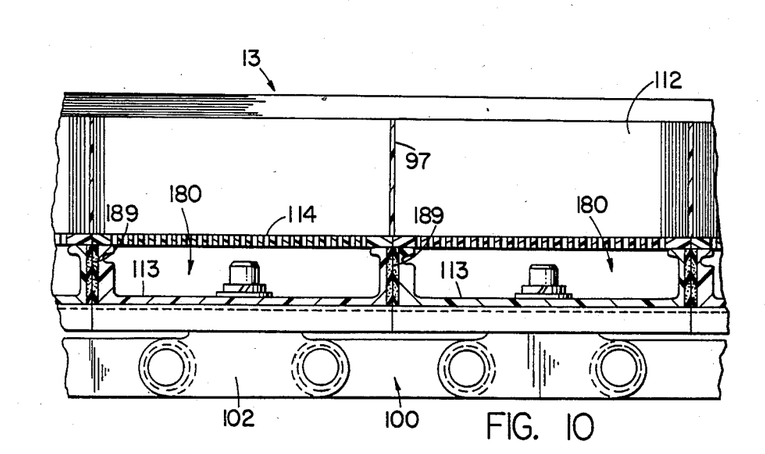
FIG. 10 is an end, sectional view of another embodiment of the slats of FIG. 8.

FIG. 10 illustrates slats 180,180 which may substitute for the slats 106,106 in the conveyor table 10 and are identical to slats 106,106 except that the slats 180,180 do not include the longitudinal recesses or the associated rubber strips 184,184. Instead, a strip of air impermeable foam 189 is connected between each pair of adjacent slats to make an air tight seal between them. The foam is attached by an adhesive to one side of one slat and serves the same function as the rubber strips 184,184.

Figure 11:
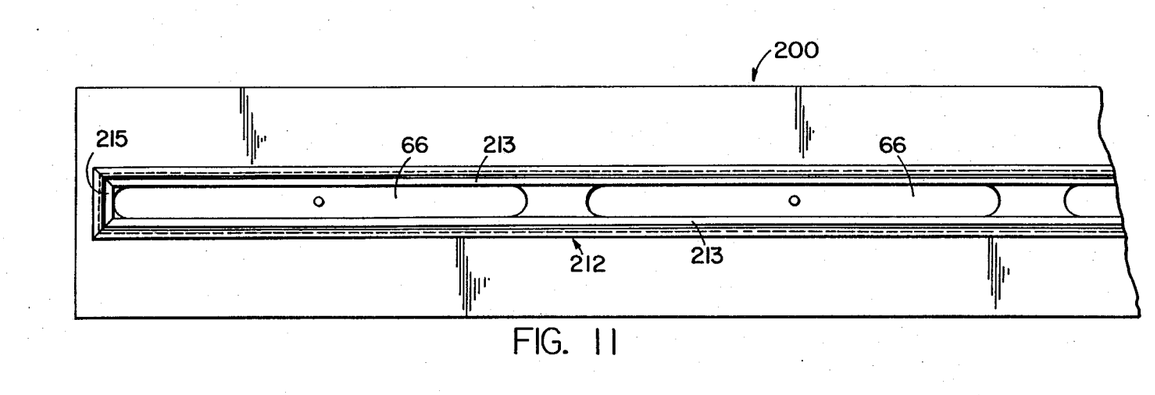
FIG. 11 is a top, fragmentary view of a vacuum manifold which can substitute for the vacuum manifold of FIG. 5 in the table of FIG. 2.

FIG. 11 illustrates a vacuum manifold 200 which may substitute for the vacuum manifold 62 of the conveyor table 10. The vacuum manifold 200 is identical to the vacuum manifold 62 except for the respective lip seals. (The manifold 200 will be discussed as if it were installed in the table 10, and like parts will be referenced with like numerals). In the vacuum manifold 200, a lip seal 212 comprises two longitudinal lip seal portions 213,213 which extend approximately the entire length of the manifold 200 along the sides of the windows 66,66 and two lateral portions 215,215 which join the longitudinal portions 213,213 at their ends to form a rectagular border which surrounds the windows 66,66. Also, the vacuum manifold 200 does not include shutters for the windows or the associated actuators so that all of the windows 66,66 are open all the time and all of the bristle mats 112,112 located above the vacuum manifold 200 are subjected to vacuum. If desired, the windows 66,66 can be replaced by one continuous slotted opening extending to the limits of the lip seal 212 and thereby framed by it.

Figure 12:
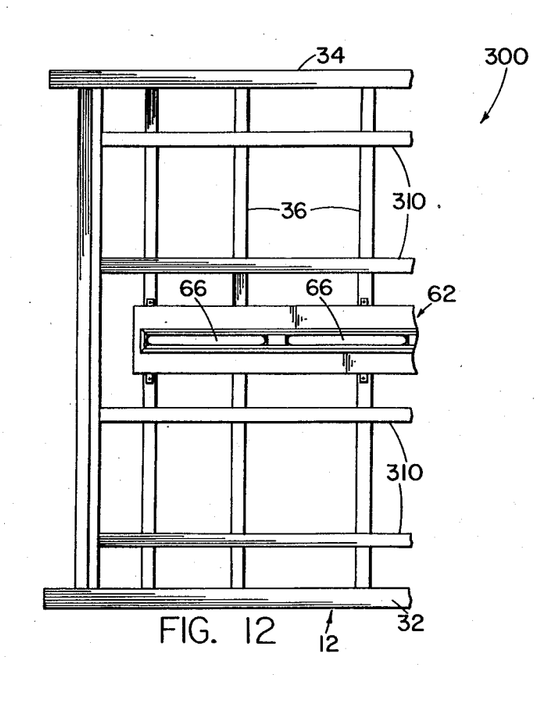
FIG. 12 is a top, fragmentary view of a frame of another conveyor table embodying the invention.

FIG. 12 illustrates another embodiment of the conveyorized, vacuum table generally designated 300, which table is identical to the table 10 except that the table 300 includes rails 310,310 which substitute for the rollers 111,111. The rails 310,310 extend the length of the table and have a low-friction, upper surface, for example, one made of smooth plastic or Teflon, so that the slats 106,106 easily slide along the rails as they travel in the X-coordinate direction.

The rails 310,310 provide a very simple and inexpensive means for supporting the slats 106,106.

Figure 13:
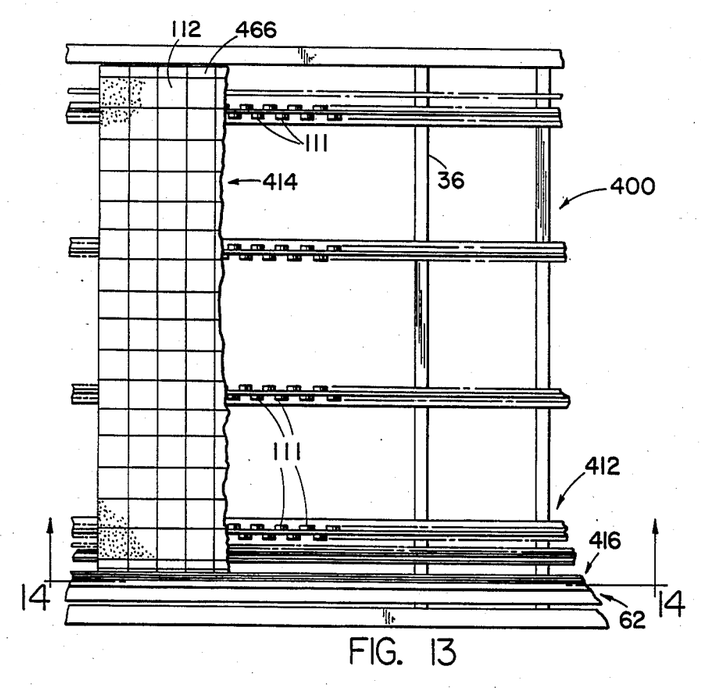
FIG. 13 is a top, fragmentary view of another conveyor table embodying the present invention.
Figure 14:
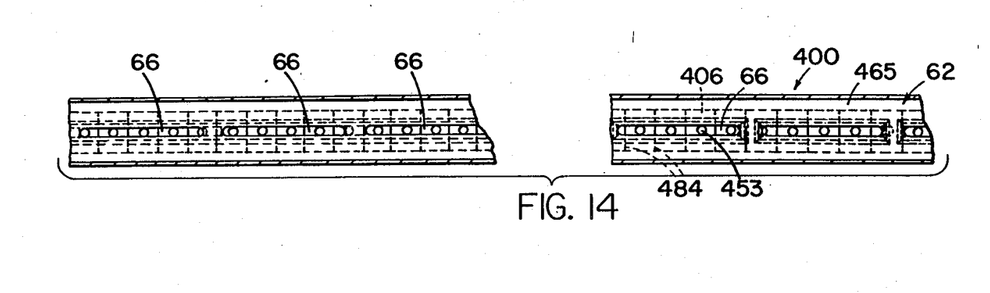
FIG. 14 is a sectional view of the table of FIG. 13 taken along the line 14—14.
Figure 15:
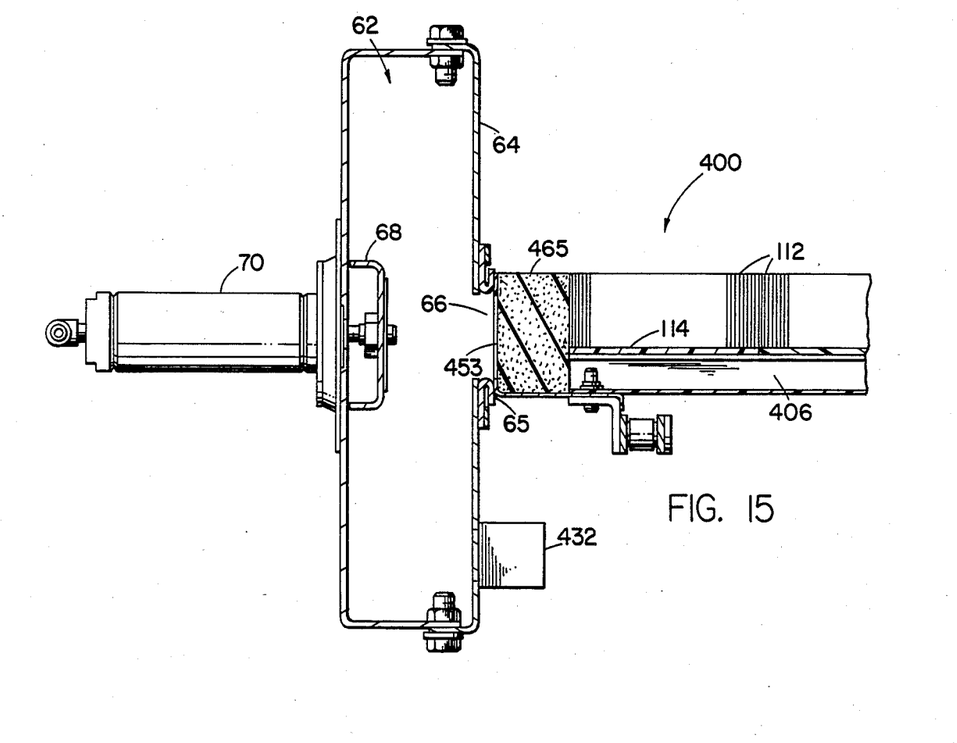
FIG. 15 is a side sectional view of FIG. 14.

FIGS. 13-15 illustrate a conveyorized, vacuum table generally designated 400 embodying the present invention, which table is similar to the table 10 except for the means for applying vacuum to the slats. The table 400 includes a frame 412, a conveyor 414 for supporting and transporting sheet material, a vacuum hold down system 416 for holding the sheet material onto the conveyor 414, the cutting assembly 20 (not shown) for cutting the sheet material and a controller including a computer.

The frame 412 is similar to the frame 12 except that only one of the upper side edge beams 432 (FIG. 15) in the frame 412 is coupled to the vacuum holddown system 416. The vacuum system 416 includes the vacuum manifold 62 of the table 10 and is similar to the vacuum system 16 except for the positioning of the vacuum manifold 62. In the table 400, the vacuum manifold 62 is turned on its side, mounted adjacent the beam 432 with the window openings 66,66 facing inwardly toward the conveyor 414, and communicates with the interior of the beam 432. The vacuum duct 64 extends from a receiving end of the table 400 to a short distance from a discharge end of the table 400 where the cut pattern pieces and scrap are removed from it.

The conveyor 414 is similar to the conveyor 14 except for a modification to the slats. Like the slats 106,106, the slats 406,406 of the table 400 are generally trough-shaped and open at the top. However, each of the slats 406,406 does not have an aperture passing through the bottom.

Instead, one of the ends of each slat 406 is covered with an end cap 465 which is fixedly attached thereto and has an aperture 453 passing therethrough, which apertures 453,453 are aligned with the windows 66,66 so that when a slat 406 is laterally aligned with one of the windows 66,66, the interior of the slat 406 communicates with the interior of the vacuum duct 64. The other ends of the slats 406,406 may be covered with a closed metal cap 466 or with a foam cap (not shown). Hence, when the vacuum pump 42 is activated, air is drawn through the bristle mats 112,112, the chambers within the slats 406,406, the vacuum manifold 62, the frame portion 432, the vacuum duct 63, the hose 50, the filter 44, the hose 46 and the vacuum pump 42. By way of example, the aperture 453 is 1¾ inches in diameter so that when the slat is located between two adjacent windows 66,66, it overlaps them and the chamber within the slats communicates with the vacuum duct 64 when either or both of the windows are open. Bristle mats 112,112 cover the slats 406,406.

The slats 406,406 are supported by the rollers 111,111. However, if desired, the low friction rails 110,110 may be substituted for the rollers 111,111.

Rubber strips 484,484 are attached between the slats 406,406 top to bottom, adjacent the vacuum duct 64 and flush with the end caps 465 to make an airtight seal between the slats and against the lip seal 65, so that as the slats 406,406 move longitudinally of the table 400, the rubber strips 484,484 block the adjacent window openings 66,66 so that only the interior of the slats 406,406 via the apertures 453,453 communicates with the vacuum duct 64. If desired, foam may be substituted for the rubber strips 484,484.

The conveyor table 400 is operated just as the conveyor table 10 with the initial manual setup and subsequent computer controlled automatic operation. In addition, the Mylar srips 97,97 are installed between the rows of bristle mats 112,112 to prevent longitudinal migration of vacuum.

If desired, the vacuum manifold 200 may be substituted for the vacuum manifold 62 in the conveyor table 400.

Figure 16:
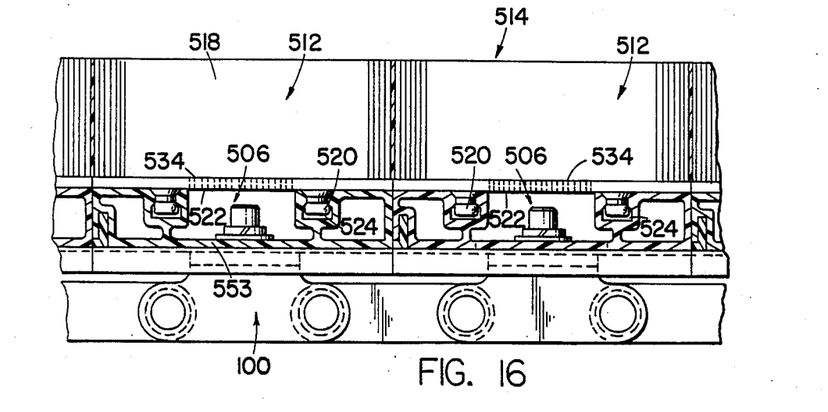
FIG. 16 is a fragmentary, sectional view of another conveyor belt which may substitute for the belt of the table 10.

FIG. 16 illustrates another conveyor belt generally designated 514 which may substitute for the belt 14 in the table 10. The conveyor belt 514 comprises bristle mats 512,512 and slats 506,506. Each of the bristle mats includes a penetrable bristle bed portion 518, a perforated base portion 536, and anchors 520,520. Each of the slats 506,506 is generally trough-shaped, has a rectangular opening 522 at the top, and recesses 524,524 to receive and hold the anchors 520,520 of the mats 512,512. The anchor and recess arrangement provides an easy means for constructing or replacing the bristle bed which wears over time from exposure to the cutting blade of the head 132. Each of the slats 506,506 also includes an aperture 553 through the bottom to communicate with the vacuum manifold 62 (not shown), which aperture 553 is identical in shape and positioning to the aperture 53 in the slat 106. The belt 514 also includes the rubber strips 184,184.

By the foregoing, conveyorized vacuum tables embodying the present invention have been disclosed, However, numerous modifications and substitutions may be made without deviating from the spirit of the invention. For example, other types of air permeable, penetrable beds can be substituted for the bristle mats 112,112, for example, an air permeable foam bed. Futhermore, different types of cutters can substitute for the cutting head 20, for example, a steel rule die which moves downwardly to cut the sheet material 15.

Also, if desired, the actuator 70,70 and plunger shutters 68,68 may be installed in the vacuum manifold 200 to provide some degree of vacuum zoning. For some applications, it may be desirable to decrease the level of vacuum applied to the rows of mats located above the modified vacuum manifold 200 near the discharge end 72 of the table to make it even easier to remove the pattern pieces and scrap, keeping in mind that the Mylar strips 97,97 are usually not 100% effective in preventing longitudinal migration of the vacuum especially when damaged by previous cutting operations. To decrease the vacuum at the discharge end, the actuator 70 associated with the most downstream window 66 can be activated to close the associated shutter 68. Because of the thickness of the lip seal 65, there is a gap 107 (similar to what is shown in FIG. 6) between the slats 106,106 and the manifold 62. Consequently, a degree of vacuum is still applied to the slats 106,106 located above the closed window 66a. However, this vacuum is less than if the most downstream window 66 were open and less than the vacuum applied to the slats 106, 106 located above the open windows because of the pressure drop from the open windows 66,66 across the gap. Similarly, the vacuum applied to the slats and the mats above any other window 66 can be lessened by closing the respective window.

Therefore, the invention has been disclosed by way of illustration and not limitation.

We claim:
1. An apparatus for feeding sheet material, said apparatus comprising:

conveyor means for feeding said sheet material in a longitudinal direction to a work position, said conveyor means comprising an air-permeable bed defining a support surface for supporting said sheet material during feeding and pentrable by a tool at the work position, and a plurality of vacuum chambers supported for longitudinal movement with said permeable bed, each vacuum chamber being adjacent a transverse portion of said penetrable bed and in fluid communication with the adjacent, permeable bed portion, and having an evacuation aperture with a cross sectional area that is small in comparison to the area of the support surface of the adjacent transverse bed portion in fluid communication with the chamber, and means for evacuating the air-permeable bed through the evacuation apertures and the vacuum chambers to cause said sheet material to be held down on said support surface without generating large forces due to air pressure on the support surface.

2. An apparatus as set forth in claim 1 wherein each of said vacuum chambers is positioned adjacent a side of the transverse bed portion opposite from the support surface and said means for evacuating said vacuum chambers interfaces said housing of each of said vacuum chambers at the evacuation aperture to minimize the net force on said conveyor due to atmospheric pressure.

3. An apparatus as set forth in claim 1 wherein said means for evacuating said vacuum chambers comprises:
a vacuum duct mounted longitudinally of and in stationary relationship with respect to said conveyor means and interfacing with the evacuation apertures of said vacuum chambers.

4. An apparatus as set forth in claim 3 wherein said vacuum chambers slide adjacent said vaccum duct, said vacuum duct has an opening registering with the evacuation apertures of the said vacuum chambers as they slide adjacent said vacuum duct.

5. An apparatus as set forth in claim 4 wherein said vacuum duct has a seal surrounding the opening and interposed between the vacuum chambers and the duct.

6. An apparatus as set forth in claim 4 wherein said vacuum duct has at least two openings positioned to register sequentially with the evacuation aperture of a vacuum chamber and said means for evacuating said vacuum chambers further comprises means for opening and closing said openings independently of each other.

7. An apparatus as set forth in claim 6 wherein said vacuum duct interfaces with the evacuation apertures of said vacuum chambers with seal means which surrounds said two openings.

8. An apparatus as set forth in claim 6 further comprising
a tool movable in relation to said bed for working on said sheet material and wherein
said means for opening and closing said openings opens and closes them in accordance with the location of said tool.

9. An apparatus as set forth in claim 1 wherein said vacuum chambers are arranged adjacent to one another in a row which row extends longitudinally of said conveyor.

10. An apparatus as set forth in claim 9 wherein each of said vacuum chambers extends transversely of said conveyor.

11. An apparatus as set forth in claim 1 wherein each of said vacuum chambers is elongated and extends transversely of said conveyor.

12. An apparatus as set forth in claim 1 wherein said bed comprises a body portion having air flow passages and a base portion having air flow passages which base portion supports said body portion, and said vacuum chambers communicate with said bed portion via the air flow passages of said base portion.

13. An apparatus as set forth in claim 1 wherein said means evacuating said vacuum chambers includes means for applying vacuum to selected ones of said vacuum chambers.

14. An apparatus for feeding sheet material, said apparatus comprising:
conveyor means for transporting limp sheet material between loading, working, and discharging positions, said conveyor means comprising
(a) a bed defining a support surface for supporting the sheet material and being movable with the sheet material thereon between the loading, working, and discharging positions, the bed having a portion which is penetrable at and below the support surface by a tool passing through the sheet material and the support surface in the working position, and having airflow passages leading through the penetrable portion of the bed from the support surface;
(b) first duct means movable with the penetrable bed and sheet material on the support surface and connected in fluid communication with the penetrable portion of the bed for drawing air from the material through the support surface and the bed;
second duct means mounted in the apparatus in stationary relationship and having an elongated opening extending longitudinally in the direction of conveyor movement with the transverse width of the opening much smaller than the transverse width of the bed support surface, the opening being in sealing engagement with the movable first duct means for fluid communication with the penetrable bed and sheet material thereon; and
air flow moving means connected with the second duct means for removing air from the sheet material through the first and second duct means and compressing the sheet material the support surface.

15. An apparatus as set forth in claim 14 wherein said first duct means comprises a series of hollow slats which extend transversely of the conveyor means and move with said bed, said slats being in fluid communication with said bed.

* * * * *

UNITED STATES PATENT AND TRADEMARK OFFICE
CERTIFICATE OF CORRECTION

PATENT NO. : 4,646,911
DATED : March 3, 1987
INVENTOR(S) : David R. Pearl and Lawrence S. Wolfson

It is certified that error appears in the above-indentified patent and that said Letters Patent is hereby corrected as shown below:

Column 11, claim 8, lines 54-60, should be deleted.

Signed and Sealed this

Seventeenth Day of September, 1996

Attest:

BRUCE LEHMAN

*Attesting Officer*      *Commissioner of Patents and Trademarks*